United States Patent
Liu et al.

(10) Patent No.: US 9,729,742 B2
(45) Date of Patent: Aug. 8, 2017

(54) FLATBED SCANNING DEVICE AND SCANNING MODULE OF PAPER FEEDING SCANNING EQUIPMENT

(71) Applicant: LITE-ON TECHNOLOGY CORP., Taipei (TW)

(72) Inventors: Jen-Chieh Liu, Taipei (TW); Ta-Yi Lee, Taipei (TW); Hsin-Ju Chen, Taipei (TW); Chun-Liang Liu, Taipei (TW)

(73) Assignee: Lite-On Technology Corp., Taipei (TW)

( * ) Notice: Subject to any disclaimer, the term of this patent is extended or adjusted under 35 U.S.C. 154(b) by 0 days.

(21) Appl. No.: 15/067,593

(22) Filed: Mar. 11, 2016

(65) Prior Publication Data
US 2017/0118354 A1    Apr. 27, 2017

(30) Foreign Application Priority Data
Oct. 26, 2015  (CN) .................... 2015 2 0833395 U

(51) Int. Cl.
| | | |
|---|---|---|
| *H04N 1/04* | (2006.01) | |
| *H04N 1/00* | (2006.01) | |
| *H04N 1/10* | (2006.01) | |
| *B65H 5/06* | (2006.01) | |

(52) U.S. Cl.
CPC .......... *H04N 1/0057* (2013.01); *B65H 5/062* (2013.01); *H04N 1/00538* (2013.01); *H04N 1/00557* (2013.01); *H04N 1/04* (2013.01); *H04N 1/1061* (2013.01); *H04N 2201/0081* (2013.01)

(58) Field of Classification Search
CPC .... H04N 1/0057; H04N 1/00538; H04N 1/04; H04N 1/1061; H04N 2201/0081; H04N 1/00557; B65H 5/0062; B65H 5/062
USPC .......................... 358/496, 498, 497, 474, 505
See application file for complete search history.

(56) References Cited

U.S. PATENT DOCUMENTS

| | | | | |
|---|---|---|---|---|
| 5,769,515 | A * | 6/1998 | Chang .................. | H04N 1/1013 292/209 |
| 6,285,441 | B1 * | 9/2001 | Takahara ................. | H04N 1/03 355/67 |
| 7,253,930 | B2 * | 8/2007 | Hendrix ................. | H04N 1/103 358/474 |
| 7,755,810 | B2 * | 7/2010 | Kuse ..................... | H04N 1/1017 358/474 |
| 7,911,663 | B2 * | 3/2011 | Tamai ...................... | H04N 1/03 358/474 |
| 7,985,032 | B2 * | 7/2011 | Takahashi .................. | B41J 2/32 400/652 |
| 8,089,664 | B2 * | 1/2012 | Yokochi ............. | H04N 1/00013 358/474 |

(Continued)

*Primary Examiner* — Cheukfan Lee
(74) *Attorney, Agent, or Firm* — Rosenberg, Klein & Lee

(57) ABSTRACT

A flatbed scanning device of a paper feeding scanning equipment includes a device casing and a scanning module. The device casing includes a first glass plate, and a second glass plate spaced apart from the first glass plate and having a bottom surface. The scanning module is disposed in the device casing, and including a module body, a scanning assembly disposed in the module body, and at least one contact assembly disposed on the module body. When the scanning module is in an initial position, the scanning assembly is located below the first glass plate, and the at least one contact assembly abuttingly contacts the bottom surface of the second glass plate.

20 Claims, 12 Drawing Sheets

(56) References Cited

U.S. PATENT DOCUMENTS

| | | | | |
|---|---|---|---|---|
| 8,111,274 B2* | 2/2012 | Hirai | ................. | B41J 2/32 |
| | | | | 347/220 |
| 8,159,731 B2* | 4/2012 | Sato | ................. | H04N 1/00795 |
| | | | | 358/474 |
| 8,300,282 B2* | 10/2012 | Nakakita | ............. | H04N 1/1017 |
| | | | | 358/474 |
| 8,427,719 B2* | 4/2013 | Fujiwara | ............ | H04N 1/00002 |
| | | | | 358/488 |
| 2003/0081268 A1* | 5/2003 | Hirayama | ............ | H04N 1/1017 |
| | | | | 358/474 |
| 2006/0152772 A1* | 7/2006 | Sawada | ................ | H04N 1/1013 |
| | | | | 358/474 |
| 2014/0009801 A1* | 1/2014 | Osakabe | ............ | H04N 1/00997 |
| | | | | 358/497 |

* cited by examiner

FLATBED SCANNING DEVICE AND SCANNING MODULE OF PAPER FEEDING SCANNING EQUIPMENT

CROSS-REFERENCE TO RELATED APPLICATION

This application claims priority to Chinese Application No. 201520833395.3, filed on Oct. 26, 2015.

FIELD

The disclosure relates to a scanning equipment, and more particularly to a flatbed scanning device and a scanning module of a paper feeding scanning equipment.

BACKGROUND

An existing paper feeding scanning equipment includes an automatic paper feeding device and a flatbed scanning device. The flatbed scanning device includes a device casing, a first glass plate disposed on the device casing, a second glass plate disposed on the device casing and spaced apart from the first glass plate, and a scanning module disposed in the device casing. The device casing has a bridging plate interconnecting the first and second glass plates. The scanning module has a module body and a contact assembly adhered to a top surface of the module body. The contact assembly is used for abutting against a bottom surface of the first or second glass plate.

The scanning module is movable between a first position, where the scanning module is disposed below the first glass plate, and a second position, where the scanning module is disposed below the second glass plate so as to respectively perform paper feeding and flatbed scanning operations. During movement of the scanning module between the first and second positions, the contact assembly moves across the bridging plate and abuts against the bottom surface of the first or second glass plate. Consequently, the contact assembly produces friction with confronting corners of the first and second glass plates, thereby easily accelerating wear of the contact assembly. Thus, the service life of the contact assembly is reduced, and the scanning module cannot stably move across the bridging plate between the first and second positions.

SUMMARY

Therefore, an object of the present disclosure is to provide a flatbed scanning device of a paper feeding scanning equipment. With the design of at least one contact assembly of a scanning module thereof, the at least one contact assembly can be prevented from frictionally contacting confronting corners of first and second glass plates of the flatbed scanning device when it moves across a bridging plate interconnecting the first and second glass plates. Through this, the acceleration of wear of the at least one contact assembly can be reduced to enhance the service life thereof and to increase smooth and stable movement of the scanning module.

Another object of the present disclosure is to provide a scanning module of a paper feeding scanning equipment. With the design of at least one contact assembly thereof, the at least one contact assembly can be prevented from frictionally contacting confronting corners of first and second glass plates of the scanning equipment when it moves across a bridging plate interconnecting the first and second glass plates. Through this, the acceleration of wear of the at least one contact assembly can be reduced to enhance the service life thereof and to increase smooth and stable movement of the scanning module.

According to one aspect of the present disclosure, a flatbed scanning device of a paper feeding scanning equipment includes a device casing and a scanning module.

The device casing includes a first glass plate, and a second glass plate spaced apart from the first glass plate. The second glass plate has a bottom surface. The scanning module is disposed in the device casing, and includes a module body, a scanning assembly disposed in the module body, and at least one contact assembly disposed on the module body. When the scanning module is in an initial position, the scanning assembly is located below the first glass plate, and the at least one contact assembly abuttingly contacts the bottom surface of the second glass plate.

According to another aspect of the present disclosure, a scanning module of a paper feeding scanning equipment includes a module body, a scanning assembly and at least one contact assembly. The paper feeding scanning equipment includes a first glass plate and a second glass plate spaced apart from the first glass plate and having a bottom surface.

The scanning assembly is disposed in the module body. The at least one contact assembly is disposed on the module body. When the scanning module is in an initial position, the scanning assembly is configured to be located below the first glass plate, and the at least one contact assembly is configured to abuttingly contact the bottom surface.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
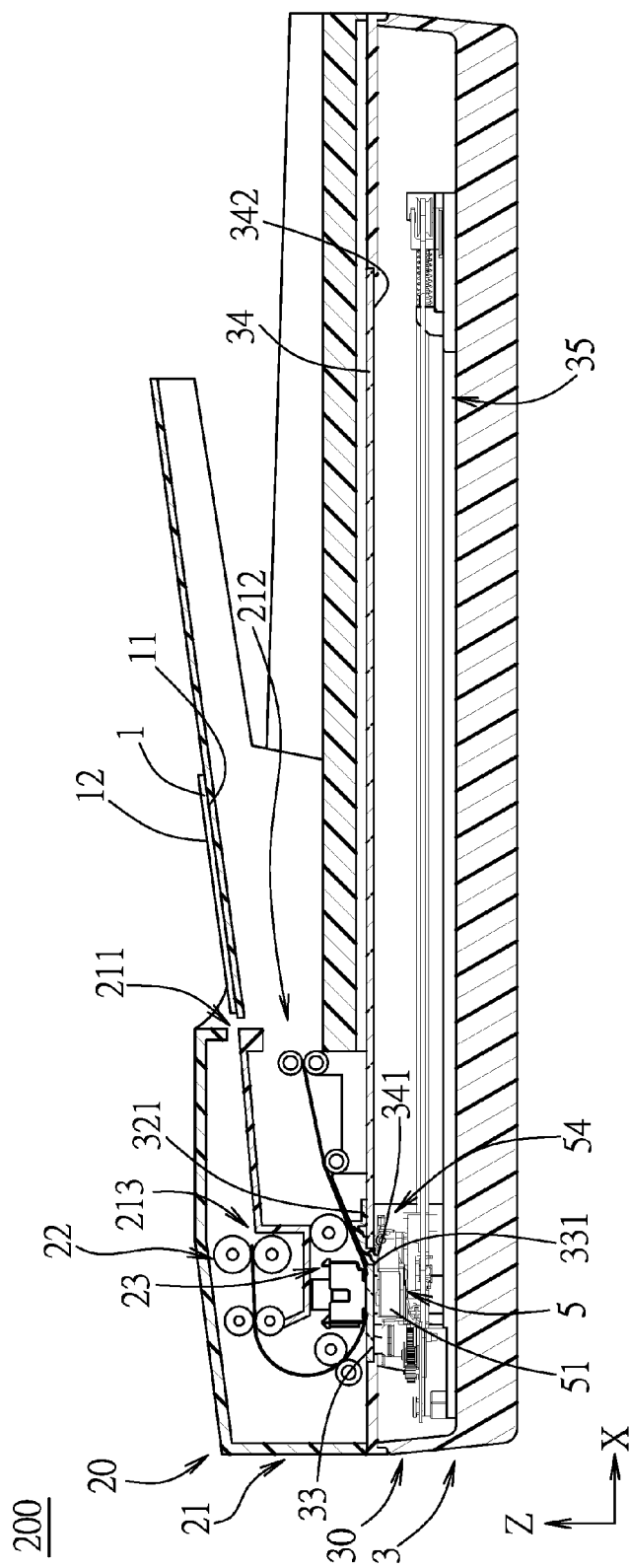
FIG. 1 is a sectional view of a paper feeding scanning equipment incorporating a flatbed scanning device according to a first embodiment of the present disclosure.

Before the disclosure is described in greater detail, it should be noted that like elements are denoted by the same reference numerals throughout the disclosure.

FIG. 1 illustrates a paper feeding scanning equipment 200 incorporating a flatbed scanning device 30 according to a first embodiment of the present disclosure. The paper feeding scanning equipment 200 is exemplified as a duplex scanning equipment. Of course, the paper feeding scanning equipment 200 may be a multifunction printer or a copy machine. The paper feeding scanning equipment 200 is used for scanning a document 1 to capture an image thereof.

The paper feeding scanning equipment 200 further includes an automatic document feeder (ADF) 20. The flatbed scanning device 30 is disposed below the ADF 20. The ADF 20 includes a housing 21, a paper feeding mechanism 22 and a scanning module 23. The housing 21 defines an entrance 211, an exit 212 spacedly located below the entrance 211, and a paper feeding path 213 located between the entrance 211 and the exit 212 and defining a direction of movement of the document 1. The paper feeding mechanism 22 is disposed in the housing 21 for driving the document 1 to move along the paper feeding path 213. When the document 1 enters the housing 21 through the entrance 211, the paper feeding mechanism can drive the document 1 to move along the paper feeding path 213 and leave the same through the exit 212. The scanning module 23 is fixedly disposed in the housing 21 and is located at one side of the paper feeding path 213 for scanning a first face 11 of the document 1. In other embodiments, the scanning module 23 may be omitted from the ADF 20, so that the ADF 20 only has a paper feeding function, but not a scanning function.

Figure 2:
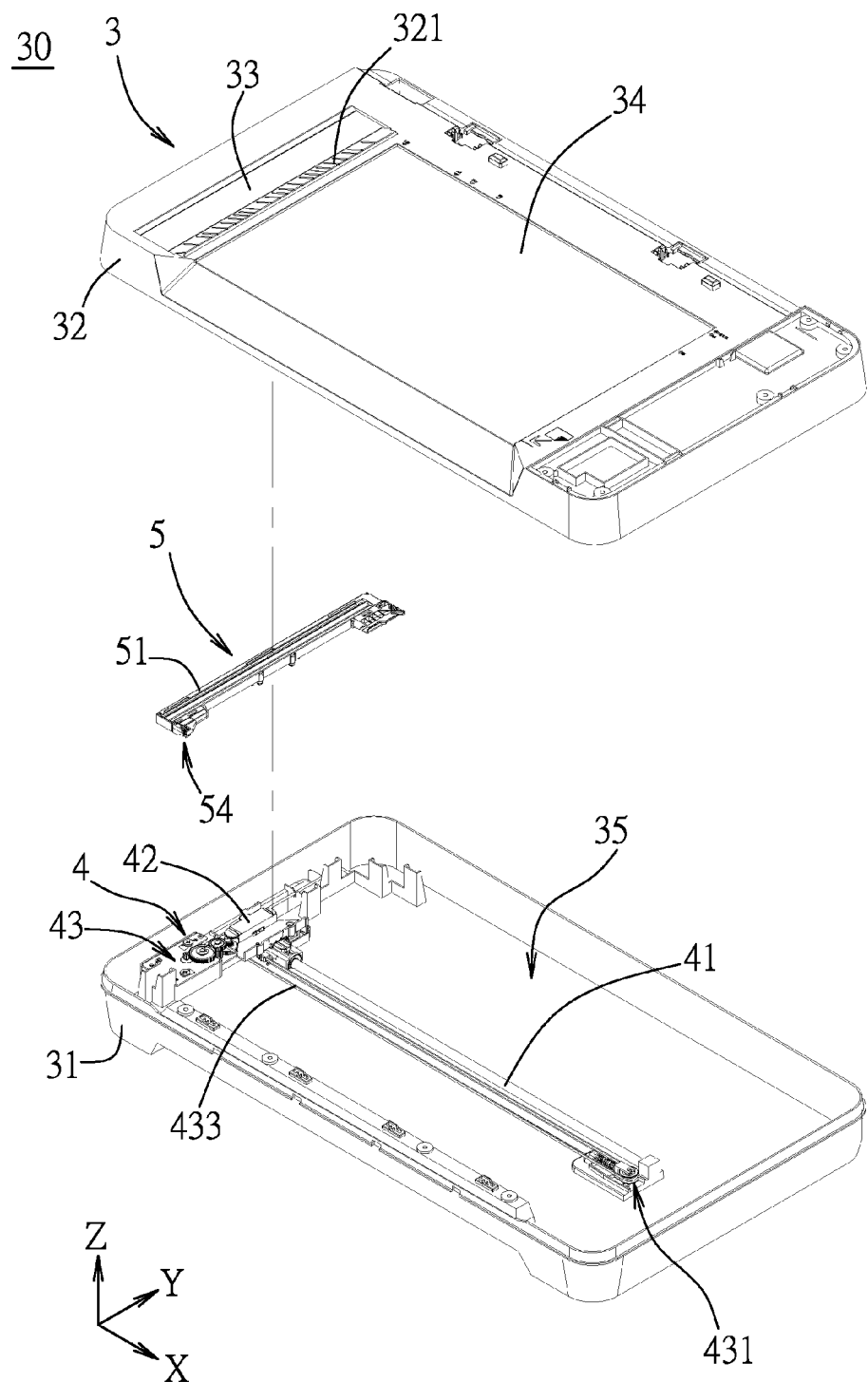
FIG. 2 is an exploded perspective view of the first embodiment of the flatbed scanning device, illustrating an assembly relationship among a device casing, a driving mechanism and a scanning module.

As shown in FIGS. 1 and 2, the flatbed scanning device 30 includes a device casing 3, a driving mechanism 4, and a scanning module 5. The device casing 3 is located below the housing 21 of the ADF 20, and includes a bottom casing member 31, a top casing member 32, a first glass plate 33, and a second glass plate 34. The top casing member 32 covers the bottom casing member 31. The top and bottom casing members 32, 31 are connected to each other using a hook and groove engaging method or a screw fastening method. The top and bottom casing members 32, 31 cooperatively define an accommodating space 35 for accommodating the driving mechanism 4 and the scanning module 5.

The first and second glass plates 33, 34 are positioned on the top casing member 32 using, for example, a plurality of retaining hooks. The first glass plate 33 has a front end 331. The second glass plate 34 has a rear end 341 and a bottom surface 342. The front end 331 of the first glass plate 33 and the rear end 341 of the second glass plate 34 are spaced apart from each other in a front-rear direction along a first horizontal axis (X). The top casing member 32 has a bridging plate 321 connected between the front end 331 of the first glass plate 33 and the rear end 341 of the second glass plate 34. The first glass plate 33 is positioned corresponding to and spaced apart below the scanning module 23. In addition, the first glass plate 33 is located beneath the paper feeding path 213 for supporting the document 1 passing under the scanning module 23. The bridging plate 321 is used to guide the document 1 passing through the first glass plate 33 to move upwardly toward the exit 212. The second glass plate 34 is used for supporting the document 1 to be flatbed scanned.

Figure 3:
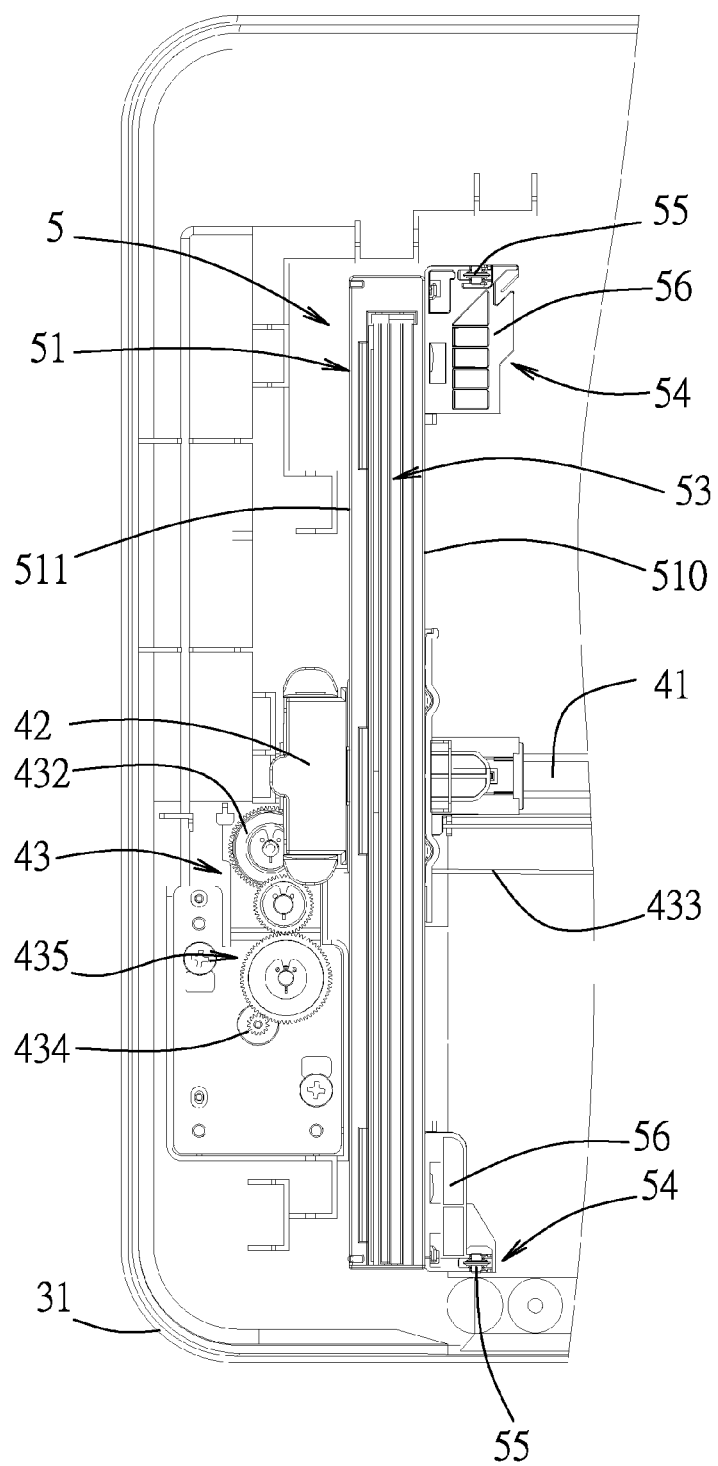
FIG. 3 is a fragmentary top view of the first embodiment, illustrating a detailed structure of the driving mechanism, and an assembly relationship between a clamping assembly and the scanning module.

As shown in FIGS. 2 and 3, the driving mechanism 4 includes an elongated guide rod 41, a clamping assembly 42 and a driving assembly 43. The guide rod 41 extends along the first horizontal axis (X), and has front and rear ends respectively and fixedly connected to the bottom casing member 31. The clamping assembly 42 is slidably sleeved on the guide rod 41 for clamping and carrying the scanning module 5. The clamping assembly 42 can drive the scanning module 5 to slide along the length of the guide rod 41. The driving assembly 43 includes a belt pulley 431, a driving gear 432, a belt 433, a driving motor 434 and a gear set 435. The belt pulley 431 and the driving gear 432 are rotatably fixed to the bottom member 31, are located on the same side of the guide rod 41, and are respectively proximate to the front and rear ends of the guide rod 41. The belt 433 is wrapped around the belt pulley 431 and the driving gear 432. The clamping assembly 42 is fixedly connected, for example in a clamping manner, to the belt 433. The driving motor 434 is fixed to the bottom casing member 31. The gear set 435 is rotatably fixed to the bottom casing member 31 and meshes between the driving gear 432 and the driving motor 434. The driving motor 434 drives rotation of the driving gear 432 through the gear set 435 during operation thereof. The rotation of the driving gear 432 drives the belt 433 to rotate around the belt pulley 431 and the driving gear 432, and the rotation of the belt 433, in turn, drives the clamping assembly 42 to slide along the length of the guide rod 41. Through this, the clamping assembly 42 can drive the scanning module 5 to move along the first horizontal axis (X) between an initial position (see FIG. 11) and a terminal position (see FIG. 13).

Figure 4:
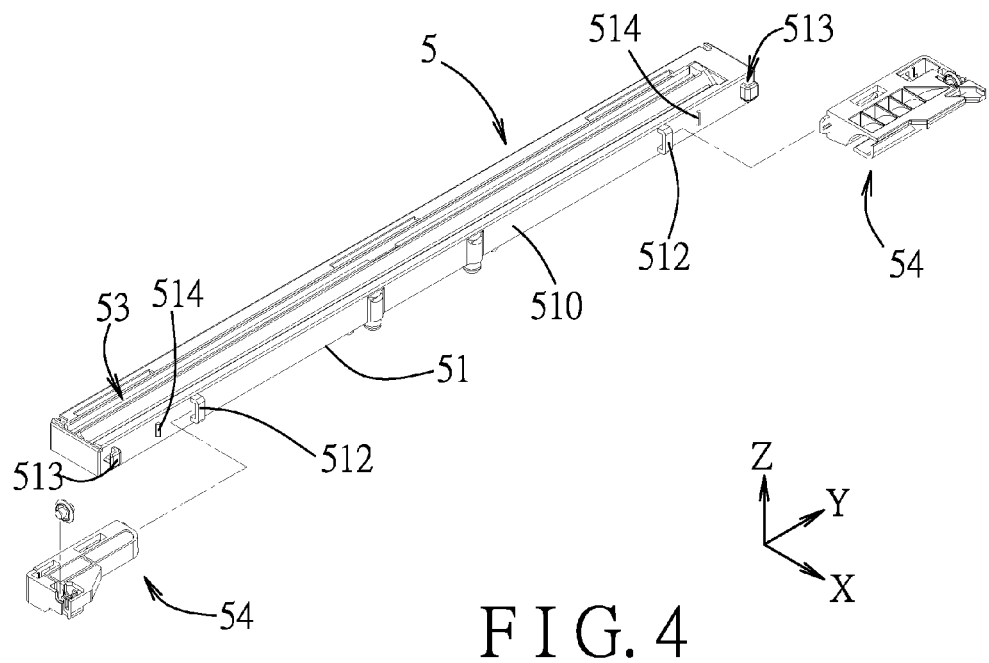
FIG. 4 is an exploded perspective view of the scanning module of the first embodiment, illustrating an assembly relationship between a module body and a contact assembly.
Figure 5:
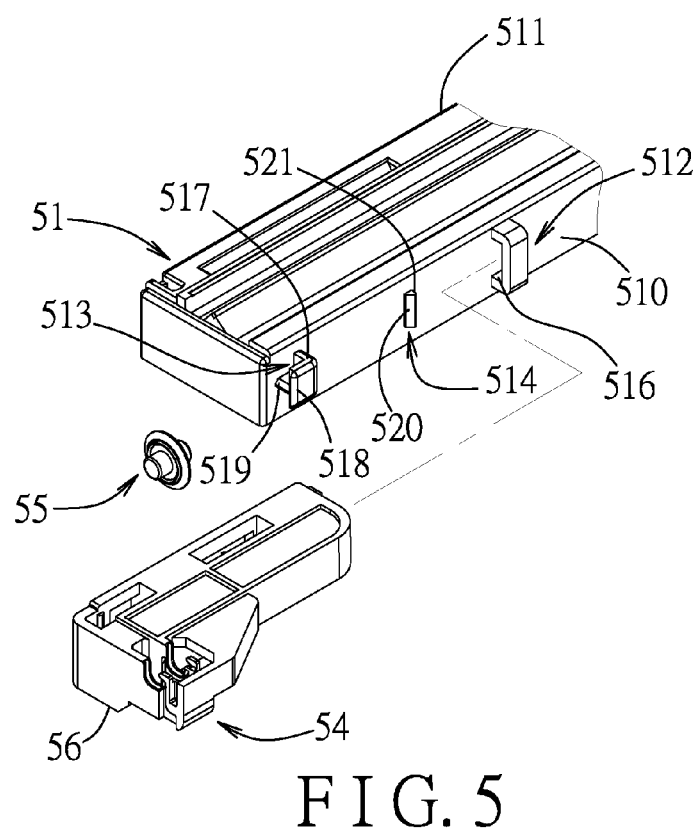
FIG. 5 is an enlarged fragmentary perspective view of FIG. 4.

Referring to FIGS. 4 and 5, in combination with FIG. 3, the scanning module 5 includes a module body 51, a scanning assembly 53, and two contact assemblies 54. The module body 51 is made of a plastic material, has a substantially rectangular shape, and is elongated along a second horizontal axis (Y) which is transverse to the first horizontal axis (X). The module body 51 includes a front end surface 510 and a rear end surface 511 opposite to the front end surface 510. The front and rear end surfaces 510, 511 are two long sides of the module body 51. The clamping assembly 42 is clamped on middle portions of the front and rear end surfaces 510, 511. The module body 51 further includes two retaining lugs 512, two engaging members 513 and two positioning blocks 514. The retaining lugs 512 protrude from the front end surface 510 and are spaced apart from each other in the left-right direction along the second horizontal axis (Y). The engaging members 513 protrude from the front end surface 510, are spaced apart from each other in the left-right direction, and are respectively proximate to two short sides of the module body 51 which are connected between the front and rear end surfaces 510, 511 thereof. The positioning blocks 514 protrude outwardly and forwardly from the front end surface 510, and are spaced apart from each other along the left-right direction. Each positioning block 514 is spacedly located between one of the retaining lugs 512 and a respective one of the engaging members 513. The retaining lug 512, the positioning block 514 and the engaging member 513 which are located on each of the left and right sides of the front end surface 510 are spacedly arranged in sequence from an inner side to an outer side of the front end surface 510 along the second horizontal axis (Y).

Each retaining lug 512 has a hole 516. Each engaging member 513 includes a first upright plate 517 extending outwardly and forwardly from the front end surface 510, a second upright plate 518 extending transversely from a front end of the first upright plate 517 in a direction away from the respective retaining lug 512 and spaced apart from the front end surface 510, and a horizontal plate 519 extending outwardly and forwardly from the front end surface 510 and connected to middle portions of the first and second upright plates 517, 518. Each positioning block 514 has a guiding bevel 520 and an engaging end surface 521 connected to the guiding bevel 520. The guiding bevel 520 faces and is spaced apart from the first upright plate 517 of the respective engaging member 513. The engaging end surface 521 faces and is spaced apart from the hole 516 of the respective retaining lug 512.

The scanning assembly 53 is disposed in the module body 51. The scanning assembly 53 of this embodiment is exemplified as a contact image sensor (CIS). Of course, the scanning assembly 53 may also be a charge coupled device (CCD) in other embodiments.

Figure 6:
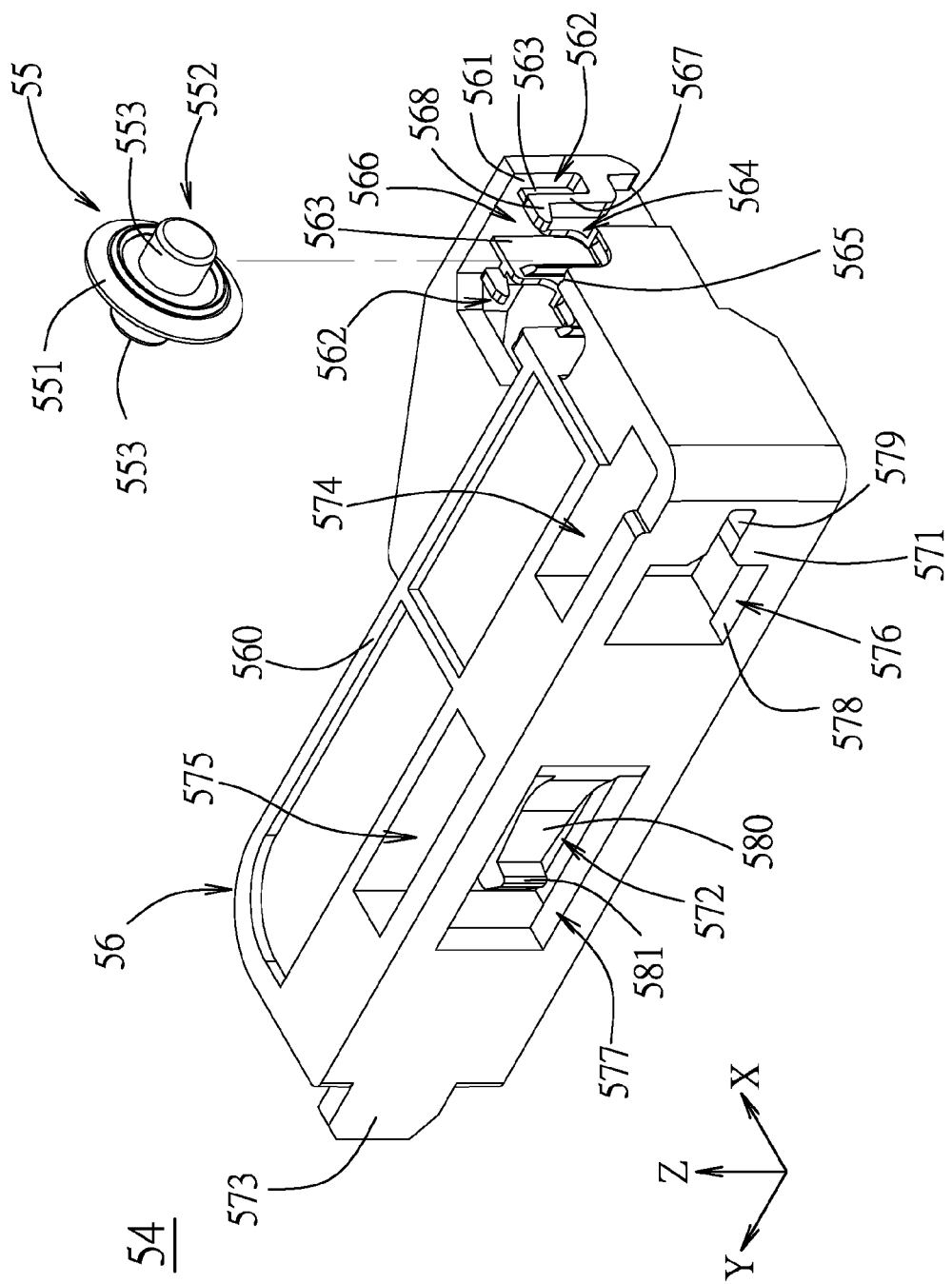
FIG. 6 is an enlarged exploded perspective view of the contact assembly of the first embodiment, illustrating an assembly relationship between a carrier and a contact member.
Figure 7:
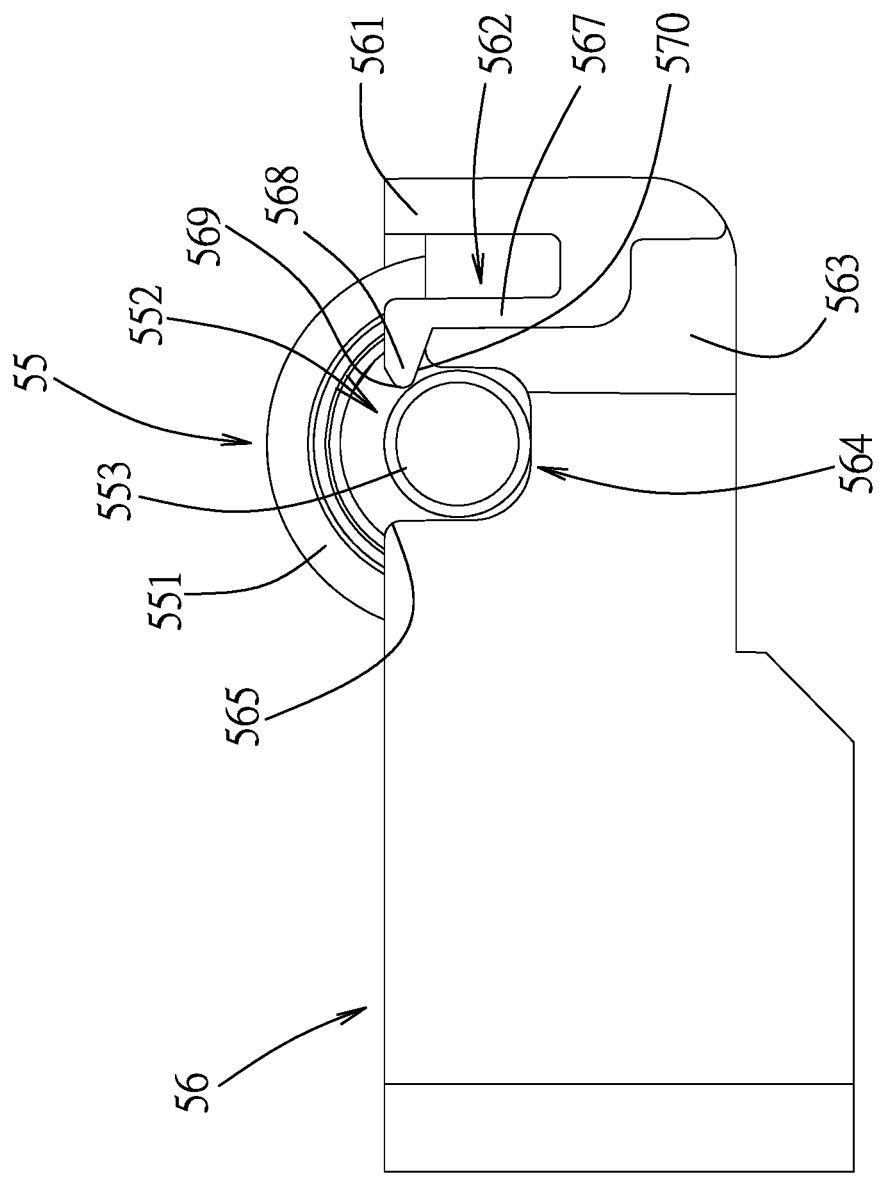
FIG. 7 is a side view of the contact assembly of the first embodiment, illustrating a shaft portion of a shaft positioned in a shaft-engaging notch, and an engaging hook engaged to the shaft portion.

Referring to FIGS. 6 to 7, in combination with FIG. 5, since the contact assemblies 54 are substantially structurally identical, only the contact assembly 54 to be mounted on the left side of the front end surface 510 of the scanning module 5 will be described in detail hereinafter. The contact assembly 54 is disposed on the front end surface 510 for abuttingly contacting the bottom surface 342 of the second glass plate 34 (see FIG. 1). The contact assembly 54 includes a contact member 55 and a carrier 56 for carrying the contact member 55 on top thereof. The contact member 55 of this embodiment is a roller and includes a roller body 551, and a shaft 552 disposed on the roller body 551. The roller body 551 is used to abuttingly contact the bottom surface 342 of the second glass plate 34. The shaft 552 has two shaft portions 553 respectively protruding from two opposite sides of the roller body 551.

The carrier 56 is made of a plastic material and includes a top wall 560, a front wall 561 transversely connected to a front end of the top wall 560, two upright walls 563 spaced apart from each other in the left-right direction and connected to a rear side of the front wall 561, and two engaging hooks 562. Each upright wall 563 has a shaft-engaging notch 564 with a top opening 565. The upright walls 563 cooperatively define a receiving groove 566 communicating with the shaft-engaging notches 564 and having an open top end. The roller body 551 is received in the receiving groove 566 via the open top end thereof such that a half portion of the roller body 551 is received in the receiving groove 566, while the other half portion thereof is exposed from the receiving groove 566 to abuttingly contact the bottom surface 342 of the second glass plate 34. The shaft portions 553 of the shaft 552 are respectively inserted into the shaft-engaging notches 564 of the upright walls 563 through the top openings 565 of the shaft-engaging notches 564. Each of the engaging hooks 562 is disposed on an outer side of a respective one of the upright walls 563, and has an arm portion 567 and a hook portion 568 formed on top of the arm portion 567. The arm portion 567 is substantially L-shaped, and is connected to the rear side of the front wall 561 and the outer side of the respective one of the upright walls 563. The hook portion 568 of each engaging hook 562 extends into the top opening 565 of the shaft-engaging notch 564 of the respective upright wall 563, and engages a respective one of the shaft portions 553 of the shaft 552.

To assemble the contact member 55 to the carrier 56, the shaft portions 553 of the shaft 552 are first aligned with the top openings 565 of the respective shaft-engaging notches 564, after which the contact member 55 is moved downwardly with force into the receiving groove 566. During the downward movement of the contact member 55, the shaft portions 553 of the shaft 552 pass through top bevels 569 of the hook portions 568 of the respective engaging hooks 562 to move into the respective shaft-engaging notches 564. When the shaft portions 553 of the shaft 552 are respectively received in the shaft-engaging notches 564, the hook portions 568 of the engaging hooks 562 respectively engage the shaft portions 553 of the shaft 552 at positions proximate to top ends thereof. Through this, removal of the shaft portions 553 of the shaft 552 from the shaft-engaging notches 564 through the top openings 565 are prevented, thereby positioning the shaft portions 553 of the shaft 552 respectively and stably in the shaft-engaging notches 564. At this time, the shaft portions 553 of the shaft 552 are respectively and rotatably received in the shaft-engaging notches 564, the half portion of the roller body 551 is received in the receiving groove 566, and the other half portion of the roller body 551 is exposed from the receiving groove 566 and protrudes out from a top end of the carrier 56.

To remove the contact member 55 from the carrier 56, the contact member 55 is forcefully pulled upward during which the shaft portions 553 of the shaft 552 will push bottom bevels 570 of the hook portions 568 of the respective engaging hooks 562 to move the hook portions 568 of the engaging hooks 562 away from the shaft-engaging notches 564, so that the shaft portions 533 of the shaft 552 can move out of the respective shaft-engaging notches 564 through the top openings 565. Hence, the contact member 55 can be conveniently and quickly assembled to or removed from the carrier 56 for replacement.

Figure 8:
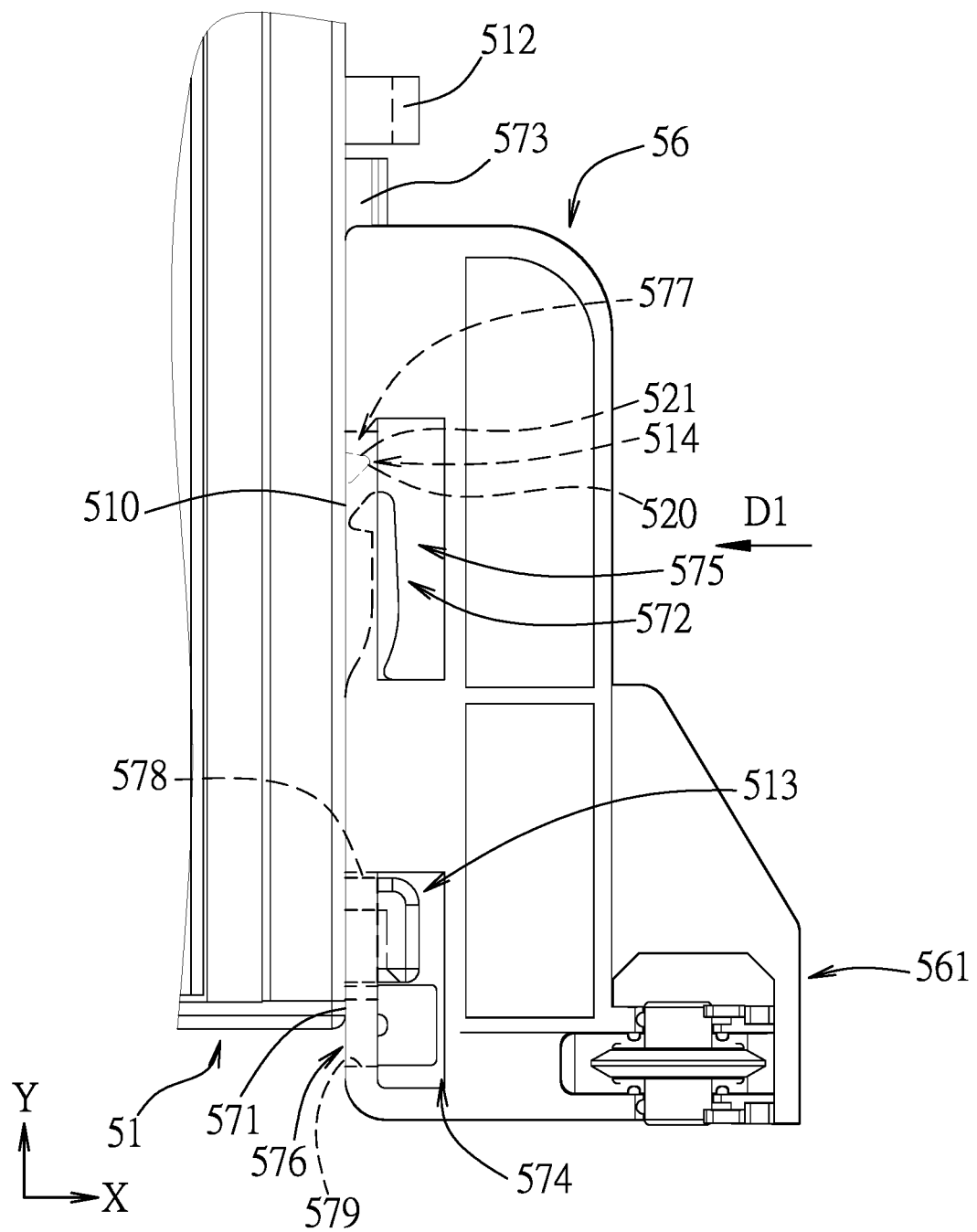
FIG. 8 is a fragmentary top view of the scanning module of the first embodiment, illustrating how the carrier is assembled to the module body.

Referring to FIG. 8, in combination with FIGS. 5 and 6, the carrier 56 further includes a rear wall 571 transversely connected to a rear end of the top wall 560 and opposite to the front wall 561, an engaging hook 572 connected to the rear wall 571, and a projecting piece 573 projecting out of the carrier 56 from an end of the rear wall 571 along the second horizontal axis (Y) and spaced apart from the engaging hook 572. The top wall 560 has a cutout groove 574 and a cutout groove 575 that are indented from the top end thereof and that are spaced apart from each other along the second horizontal axis (Y). The rear wall 571 has an engaging hole 576 spaced apart from the projecting piece 573 and communicating with the cutout groove 574, and a slot 577 spacedly disposed between the projecting piece 573 and the engaging hole 576 and communicating with the cutout groove 575. The engaging hole 576 has a first hole portion 578 proximate to the slot 577 and communicating with the cutout groove 574 for insertion of the engaging member 513 therethrough, and a second hole portion 579 opposite to the projecting piece 573, distal from the slot 577 and communicating with the first hole portion 578 and the cutout groove 574 for engagingly receiving the horizontal plate 519 of the engaging member 513. The second hole portion 579 has a width along a vertical axis (Z) transverse to the first and second horizontal axes (X, Y) smaller than that of the first hole portion 578 along the vertical axis (Z). The engaging hook 572 has a substantially curved arm part 580 connected to one side of a wall that defines the slot 577 and that is proximate to the first hole portion 578 and extending into the cutout groove 575, and a hook part 581 formed on a free end of the arm part 580 for engaging the engaging surface 521 of the positioning block 514. The projecting piece 573 projects from an inner end of the rear wall 571 for engaging the retaining lug 512 through the hole 516.

Figure 9:
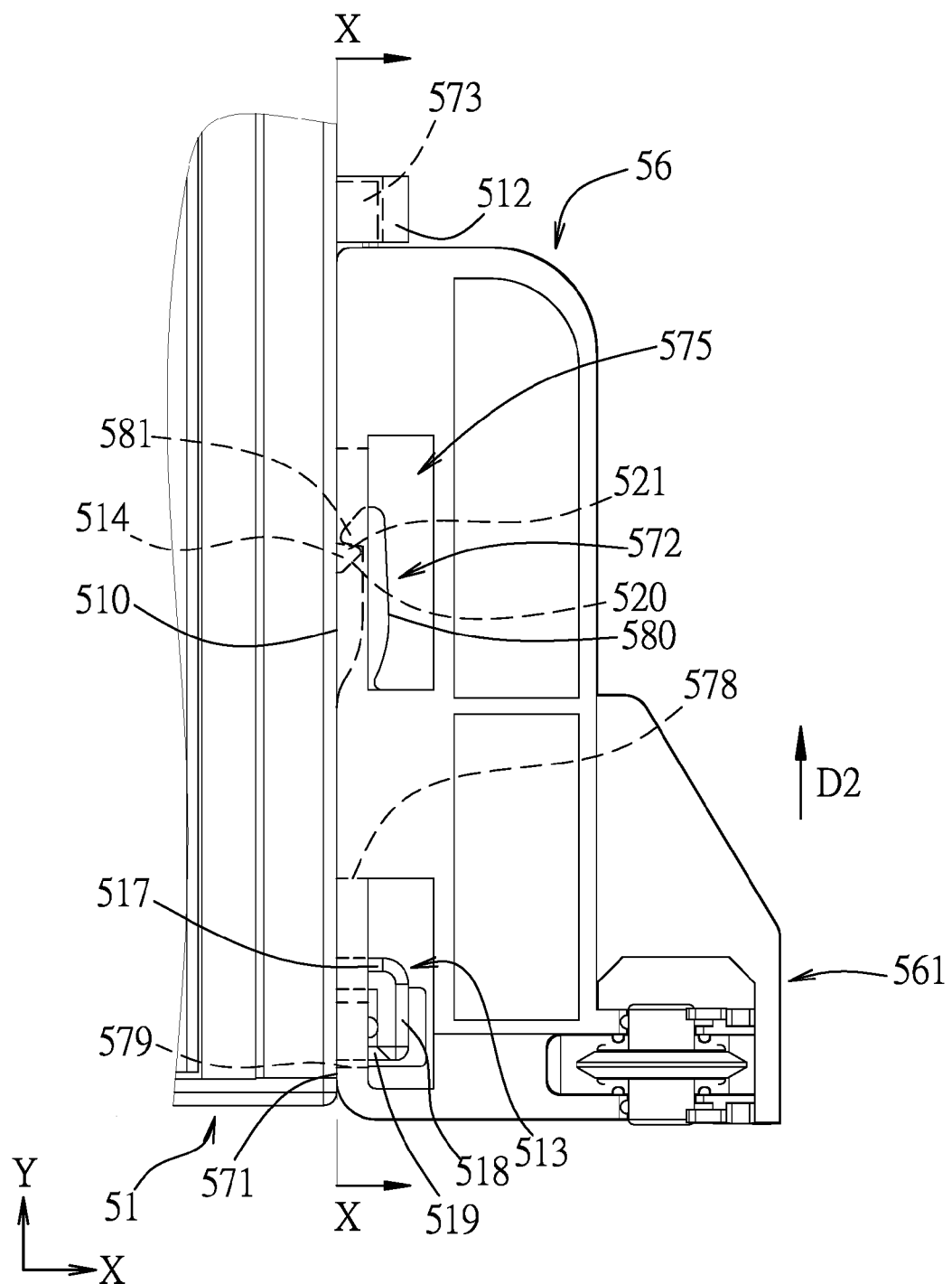
FIG. 9 is a view similar to FIG. 8, but illustrating the carrier being moved in the direction of an arrow (D2) to secure to the module body.
Figure 10:
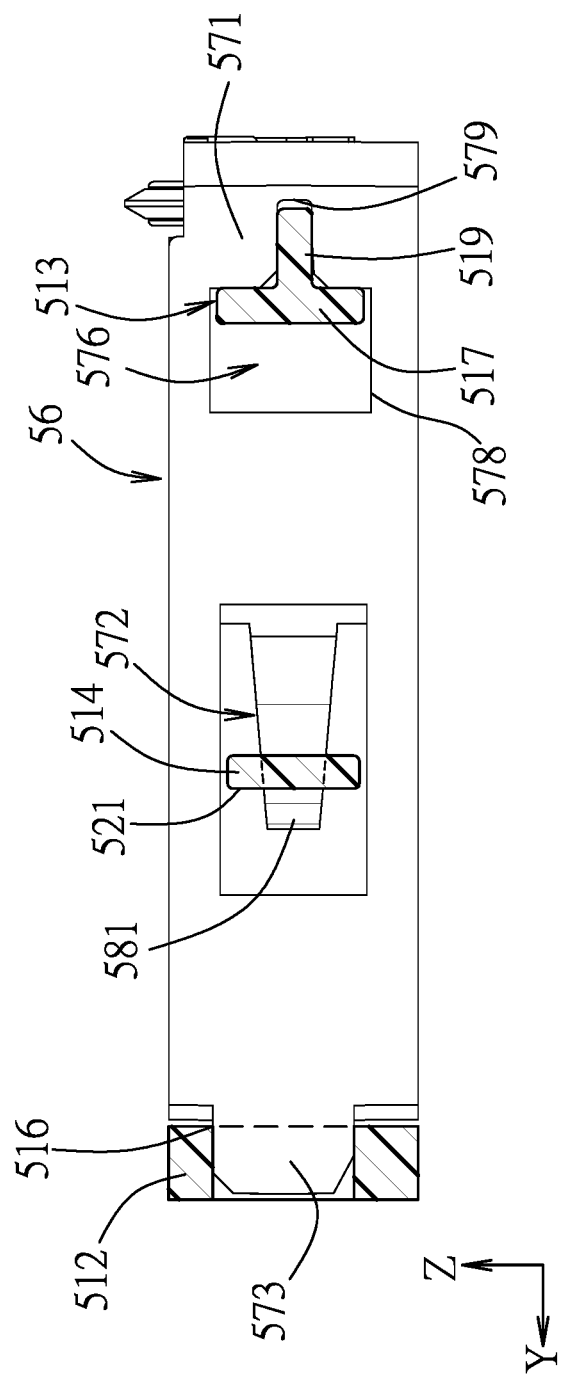
FIG. 10 is a sectional view taken along line X-X of FIG. 9.

Referring to FIGS. 9 and 10, in combination with FIG. 8, to assemble the carrier 56 to the module body 51, the first hole portion 578 of the engaging hole 576 and the slot 577 are first respectively aligned with the engaging member 513 and the positioning block 514. Then, the carrier 56 is moved rearwardly along an arrow direction (D1) parallel with the first horizontal axis (X), so that the rear wall 571 abuts against the front end surface 510 of the module body 51. At this time, the engaging member 513 extends into the cutout groove 574 through the first hole portion 578, the positioning block 514 extends into the slot 577, and the projecting piece 573 is aligned with the hole 516 of the retaining lug 512. Afterwards, the carrier 56 is pushed to move inward along an arrow direction (D2) parallel with the second horizontal axis (Y). When the hook part 581 of the engaging hook 572 contacts the guiding bevel 520 of the positioning block 514, the hook part 581 moves along the guiding bevel 520 and is pushed by the same to move forwardly, so that the arm part 580 of the engaging hook 572 is deformed relative to the rear wall 571 and moves into the cutout groove 575 for storing a restoring force.

When one side of the wall that defines the first hole portion 578 of the engaging hole 576 abuttingly contacts the first upright plate 517 of the engaging member 513, the carrier 56 is stopped from moving further. At this time, the hook part 581 moves over the guiding bevel 520 of the positioning block 514 and engages the engaging surface 521 of the positioning block 514 through the restoring force thereof. Simultaneously, the second upright plate 518 of the engaging member 513 engages a wall of the cutout groove 574 that is immediately adjacent to the second hole portion 579, the horizontal plate 519 engages the second hole portion 579, and the projecting piece 573 extends into and engages the engaging lug 512 through the hole 516.

By virtue of the second upright plate 518 engaging the wall of the cutout groove 574 that is immediately adjacent to the second hole portion 579 and the projecting piece 573 extending into the retaining lug 512, the carrier 56 is prevented from rocking in the front-rear direction along the first horizontal axis (X). Further, with the first upright wall 517 abutting against the one side of the wall that defines the first hole portion 578 of the engaging hole 576 and with the hook part 581 of the engaging hook 572 engaging the engaging end surface 521 of the positioning block 514, the carrier is prevented from rocking in the left-right direction along the second horizontal axis (Y). In addition, with the horizontal plate 519 engaging the second hole portion 579 of the engaging hole 576 and with the projecting piece 573 engaging the retaining lug 512, the carrier 56 is prevented from rocking in a top-bottom direction along the vertical axis (Z). Through this, the carrier 56 can be stably connected to the module body 51. According to the aforesaid connection structural design, the carrier 56 can be conveniently and quickly assembled and positioned to the module body 51.

Figures 11, 12:
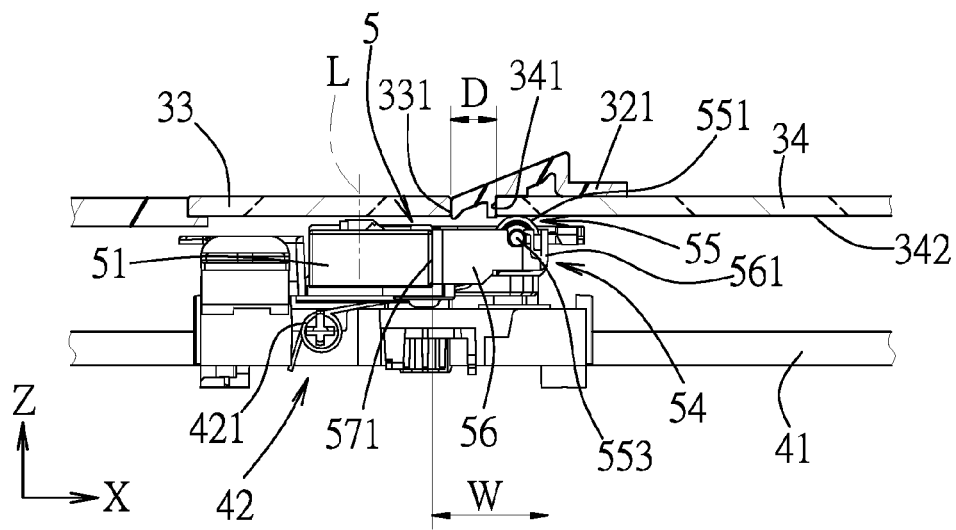
FIG. 11 is a fragmentary partly sectional view of the first embodiment of the flatbed scanning device, illustrating the scanning module in an initial position.
FIG. 12 is a view similar to FIG. 11, but illustrating the scanning module in a scanning position.

Referring to FIG. 11, in combination with FIGS. 1 and 3, when the scanning module 5 is in the initial position, the scanning assembly 53 is located below the first glass plate 33, and a scanning line (L) thereof corresponds in position to the first glass plate 33, so that the scanning assembly 53 can scan a second face 12 of the document 1 being fed. Further, the front end 331 of the first glass plate 33 and the rear end 341 of the second glass plate 34 are spaced apart from each other by a distance (D), the carrier 56 has a width (W) along the first horizontal axis (X) between the front and rear walls 561, 571 thereof. The width (W) is greater than the distance (D). Hence, when the scanning module 5 is in the initial position, a portion of the top wall 560 that is proximate to the front wall 561 and the contact member 55 are located below the second glass plate 34, and the roller body 551 of the contact member 55 abuttingly contacts the bottom surface 342 of the second glass plate 34. Through an upward supporting force provided by a torsion spring 421 of the clamping assembly 42, the roller body 551 of the contact member 55 is biased to abut against the bottom surface 342 of the second glass plate 34. Through this, the scanning assembly 53 can be spaced apart from the first or second glass plate 33, 34 by a fixed distance.

Figure 13:
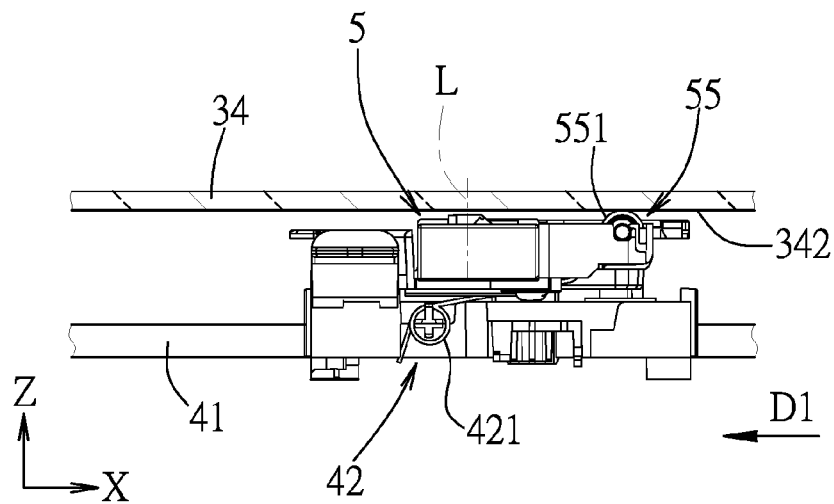
FIG. 13 is a view similar to FIG. 11, but illustrating the scanning module in a terminal position.

Referring to FIGS. 12 and 13, in combination with FIGS. 1 and 3, to perform a flatbed scanning operation using the flatbed scanning device 30, the driving assembly 43 is actuated to drive the clamping assembly 42 to move the scanning module 5 along an arrow direction (D3) opposite to the arrow direction (D1). During the movement of the scanning module 5, the roller body 551 of the contact member 55 rolls on the bottom surface 342 of the second glass plate 34. When the scanning module 5 moves to a scanning position, as shown in FIG. 12, the scanning assembly 53 is located below the second glass plate 34, and the scanning line (L) corresponds to the second glass plate 34 without being blocked by the bridging plate 321. At this time, the scanning assembly 53 will start to scan a document (not shown) carried on the second glass plate 34. When the scanning module 5 moves to the terminal position, as shown in FIG. 13, the scanning assembly 53 stops scanning and the scanning operation of the document is completed. Afterwards, the driving assembly 43 drives the clamping assembly 42 to move the scanning module 5 along the arrow direction (D1) opposite to the arrow direction (D3) so as to bring the scanning module 5 back to the initial position.

During the movement of the scanning module 5 between the initial and terminal positions, because the roller body 551 of the contact member 55 is in continuous contact with the bottom surface 342 of the second glass plate 34, the contact member 55 is prevented from crossing over the bridging plate 321 and frictionally contacting the confronting corners of first and second glass plates 33, 34, thereby reducing the acceleration of wear of the contact member 55. Through this, the service life of the contact member 55 can be enhanced, and the movement of the scanning module 5 between the initial and terminal positions can be smooth and stable.

Figure 14:
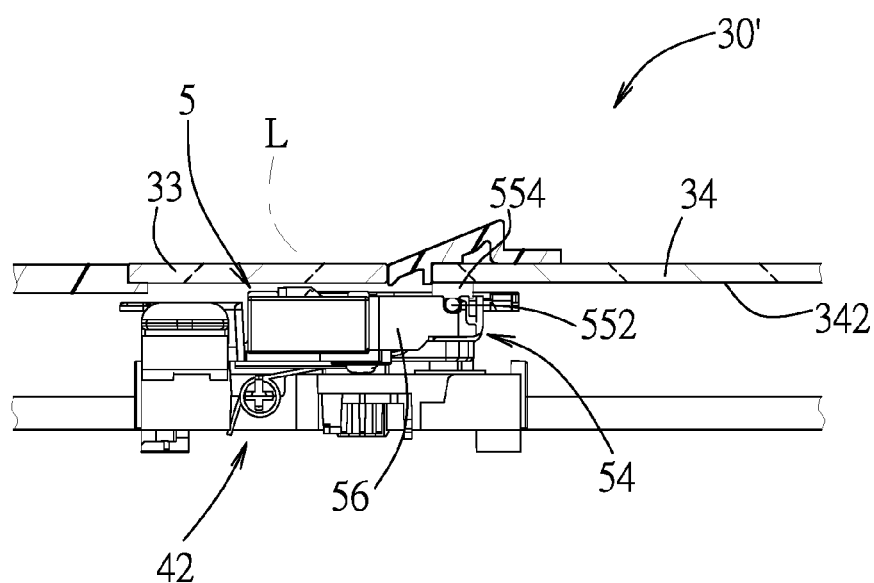
FIG. 14 is a fragmentary partly sectional view of a flatbed scanning device according to a second embodiment of the present disclosure, illustrating a scanning module of the flatbed scanning device in an initial position.
Figure 15:
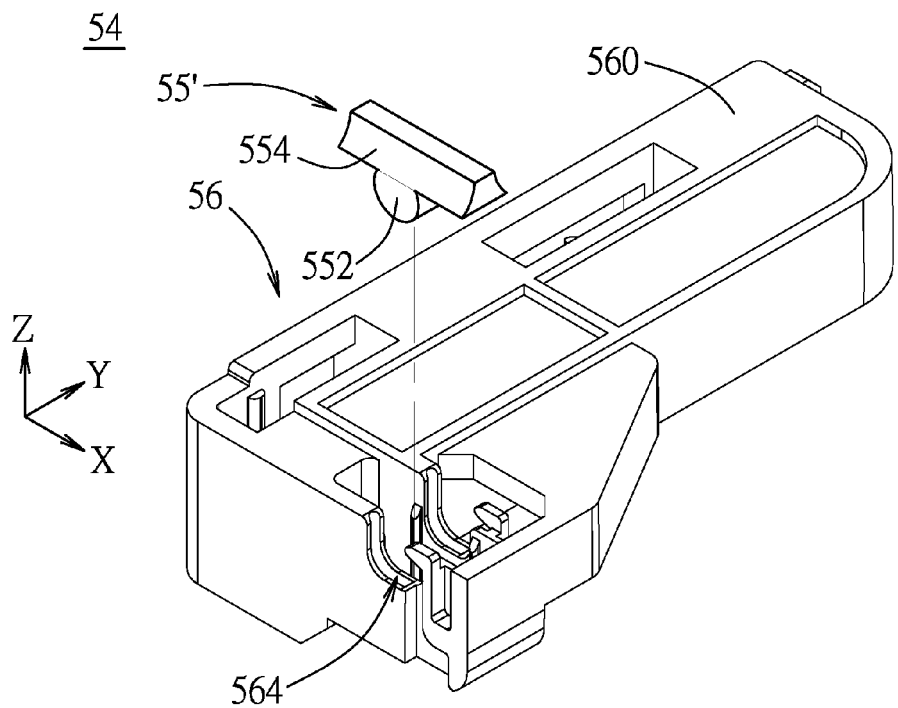
FIG. 15 is an exploded perspective view of a contact assembly of the second embodiment.

FIG. 14 is a fragmentary partly sectional view of a flatbed scanning device 30' according to a second embodiment of the present disclosure, which has a structure generally similar to that of the first embodiment. FIG. 15 is an exploded perspective view of the contact assembly 54 of the scanning module 5 of the flatbed scanning device 30'. The difference between the first and second embodiments resides in the structure of the contact member 55'.

In this embodiment, the contact member 55' of the contact assembly 54 includes the shaft 552, and a wear-resistant block 554 formed on top of the shaft 552 and extending along the first horizontal axis (X). The wear-resistant block 554 has a bottom surface abutting against the top wall 560 of the carrier 56, and a top surface abuttingly contacting the bottom surface 342 of the second glass plate 34.

Figure 16:
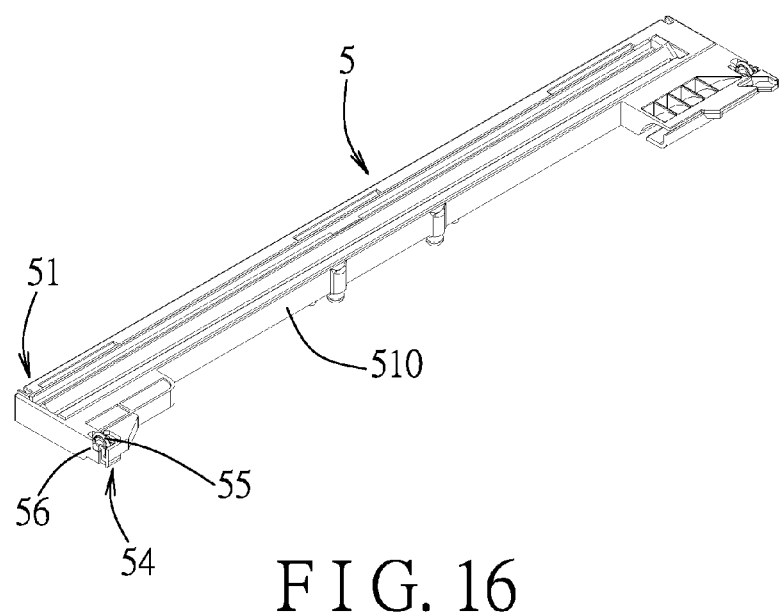
FIG. 16 is a perspective view of a scanning module of a flatbed scanning device of a paper feeding scanning equipment according to a third embodiment of the present disclosure, illustrating a carrier integrally formed as one piece with a front end surface of a module body of the scanning module.

FIG. 16 illustrates a scanning module 5 of a flatbed scanning device 30 (see FIG. 1) according to a third embodiment of the present disclosure.

In this embodiment, the carrier 56 protrudes outwardly from and is integrally formed as one piece with the front end surface 510 of the module body 51. By virtue of the carrier 56 and the module body 51 being manufactured in one-piece form, the complicated structural design thereof can be reduced, thereby saving assembly time and reducing production cost.

To sum up, by virtue of the design of the contact assembly 54 in each embodiment, during the movement of the scanning module 5 between the initial and terminal positions, the roller body 551 of the contact member 55 continuously abuttingly contacts the bottom surface 342 of the second glass plate 34. As such, the contact member 55 is prevented from crossing over the bridging plate 321 and frictionally contacting the confronting corners of first and second glass plates 33, 34. Through this, the acceleration of wear of the contact member 55 can be reduced to enhance the service life thereof and to stabilize movement of the scanning module 5 between the initial and terminal positions.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A flatbed scanning device of a paper feeding scanning equipment, comprising:
    a device casing including a first glass plate, and a second glass plate separated from said first glass plate by a space, said second glass plate having a bottom surface; and
    a scanning module disposed in said device casing, and including a module body, a scanning assembly disposed in said module body, and at least one contact assembly disposed on said module body, said contact assembly including a contact member;
    wherein, said scanning module is displaceable relative to said device casing to selectively locate said scanning assembly below each of said first and second glass plates, and each said contact member of said at least one contact assembly is supported to maintain continual abutting contact with said bottom surface of said second glass plate during the selective displacement of said scanning module.

2. The flatbed scanning device as claimed in claim 1, wherein when said scanning module is in an initial position, said scanning assembly is located below said first glass plate, wherein said first and second glass plates are spaced apart from each other by a distance along a first horizontal axis, said at least one contact assembly including a carrier connected to said module body, and said contact member is disposed on top of said carrier and abuttingly contacting said bottom surface of said second glass plate, said carrier having a width along the first horizontal axis greater than said distance.

3. The flatbed scanning device as claimed in claim 2, wherein:
    said carrier includes two shaft-engaging notches and two engaging hooks, said shaft-engaging notches being spaced apart from each other along a second horizontal axis which is transverse to the first horizontal axis, each of said shaft-engaging notches having a top opening, said engaging hooks being respectively disposed immediately adjacent to said top openings of said shaft-engaging notches;
    said contact member includes a shaft removably inserted into said shaft-engaging notches through said top openings; and
    said engaging hooks engages said shaft to prevent removal of said shaft from said shaft-engaging notches through said top openings.

4. The flatbed scanning device as claimed in claim 3, wherein:
    said carrier further includes a receiving groove communicating with said shaft-engaging notches; and
    said contact member is a roller and further includes a roller body received in said receiving groove such that a portion thereof is exposed from said receiving groove to abuttingly contact said bottom surface of said second glass plate, said shaft having two shaft portions respectively protruding from two opposite sides of said roller body and respectively and rotatably received in said shaft-engaging notches, said engaging hooks respectively engaging said shaft portions.

5. The flatbed scanning device as claimed in claim 3, wherein said contact member further includes a wear-resistant block formed on top of said shaft and abuttingly contacting said bottom surface of said second glass plate.

6. The flatbed scanning device as claimed in claim 2, wherein said module body includes a front end surface, a retaining lug protruding from said front end surface, and an engaging member protruding from said front end surface and spaced apart from said retaining lug along a second horizontal axis which is transverse to the first horizontal axis, said carrier including a projecting piece engaged to said retaining lug, and an engaging hole spaced apart from said projecting piece and engaging said engaging member when said carrier is connected to said module body.

7. The flatbed scanning device as claimed in claim 6, wherein said retaining lug has a hole, said projecting piece extending into said retaining lug through said hole, said carrier further including a rear wall that abuts against said front end surface of said module body and that has said engaging hole, and a top wall extending transversely and forwardly from a top end of said rear wall, said top wall having a cutout groove, said engaging hole having a first hole portion communicating with said cutout groove, and a second hole portion opposite to said projecting piece and communicating with said first hole portion and said cutout groove, said second hole portion having a width along a vertical axis transverse to said first and second horizontal axes smaller than that of said first hole portion along the vertical axis, said engaging member including a first upright plate extending outwardly and forwardly from said front end surface, a second upright plate extending transversely from a front end of said first upright plate in a direction away from said retaining lug and spaced apart from said front end surface, and a horizontal plate extending outwardly and forwardly from said front end surface and connected to said first and second upright plates, and wherein, when said engaging hole is engaged to said engaging member, said horizontal plate is inserted into said second hole portion and said second upright plate abuts against a wall of said cutout groove that is immediately adjacent to said second hole portion.

8. The flatbed scanning device as claimed in claim 7, wherein said module body further includes a positioning block protruding outwardly and forwardly from said front end surface, said positioning block having an engaging end surface facing and spaced apart from said hole of said retaining lug, and a guiding bevel facing and spaced apart from said first upright plate of said engaging member, said carrier further including an engaging hook connected to said rear wall, said guiding bevel guiding said engaging hook to move toward and engage said engaging end surface.

9. The flatbed scanning device as claimed in claim 2, wherein said module body includes a front end surface, said carrier protruding outwardly from and being integrally formed as one piece with said front end surface.

10. The flatbed scanning device as claimed in claim 1, wherein when said scanning module is in an initial position, said scanning assembly is located below said first glass plate, said flatbed scanning device further comprising a driving mechanism disposed in said device casing and connected to said scanning module, said driving mechanism driving said scanning module to move along a first horizontal axis between the initial position and a terminal position, wherein, when said scanning module is in the terminal position, said scanning assembly and said at least one contact assembly are located below said second glass plate, and said at least one contact assembly abuttingly contacts said bottom surface of said second glass plate.

11. The flatbed scanning device as claimed in claim 1, wherein two contact assemblies are spacedly disposed on said module body and each of the two contact assemblies abuttingly contacting said bottom surface of said second glass plate.

12. A scanning module of a paper feeding scanning equipment, the paper feeding scanning equipment including a first glass plate and a second glass plate separated from said first glass plate by a space, the second glass plate having a bottom surface, said scanning module comprising:
a module body;
a scanning assembly disposed in said module body; and
at least one contact assembly disposed on said module body, said contact assembly including a contact member;
wherein, said scanning module is displaceable relative to said paper feeding scanning equipment to selectively locate said scanning assembly below each of the first and second glass plates, and each said contact member of said at least one contact assembly is supported to maintain continual abutting contact with said bottom surface of said second glass plate during the selective displacement of said scanning module.

13. The scanning module as claimed in claim 12, wherein when said scanning module is in an initial position, said scanning assembly is located below said first glass plate, wherein the first and second glass plates are spaced apart from each other by a distance along a first horizontal axis, said at least one contact assembly including a carrier connected to said module body, and the contact member is disposed on top of said carrier for abuttingly contacting the bottom surface of the second glass plate, said carrier having a width along the first horizontal axis greater than the distance.

14. The scanning module as claimed in claim 13, wherein:
said carrier includes two shaft-engaging notches and two engaging hooks, said shaft-engaging notches being spaced apart from each other along a second horizontal axis which is transverse to the first horizontal axis, each of said shaft-engaging notches having a top opening, said engaging hooks being respectively disposed immediately adjacent to said top openings of said shaft-engaging notches; and
said contact member includes a shaft removably inserted into said shaft-engaging notches through said top openings, said engaging hooks engaging said shaft to prevent removal of said shaft from said shaft-engaging notches through said top openings.

15. The scanning module as claimed in claim 14, wherein:
said carrier further includes a receiving groove communicating with said shaft-engaging notches; and
said contact member is a roller and further includes a roller body received in said receiving groove such that a portion thereof is exposed from said receiving groove for abuttingly contacting the bottom surface of the second glass plate, said shaft having two shaft portions respectively protruding from two opposite sides of said roller body and respectively and rotatably received in said shaft-engaging notches, said engaging hooks respectively engaging said shaft portions.

16. The scanning module as claimed in claim 14, wherein said contact member further includes a wear-resistant block formed on top of said shaft for abuttingly contacting the bottom surface of the second glass plate.

17. The scanning module as claimed in claim 13, wherein said module body includes a front end surface, a retaining lug protruding from said front end surface, and an engaging member protruding from said front end surface and spaced apart from said retaining lug along a second horizontal axis which is transverse to the first horizontal axis, said retaining lug and said engaging member being spaced apart from each other along the second horizontal axis, said carrier including a projecting piece engaged to said retaining lug, and an engaging hole spaced apart from said projecting piece and engaging said engaging member when said carrier is connected to said module body.

18. The scanning module as claimed in claim 17, wherein said retaining lug has a hole, said projecting piece extending into said retaining lug through said hole, said carrier further including a rear wall that abuts against said front end surface of said module body and that has said engaging hole, and a top wall extending transversely and forwardly from a top end of said rear wall, said top wall having a cutout groove, said engaging hole having a first hole portion communicating with said cutout groove, and a second hole portion opposite to said projecting piece and communicating with said first hole portion and said cutout groove, said second hole portion having a width along a vertical axis transverse to said first and second axial directions smaller than that of said first hole portion along the vertical axis, said engaging member including a first upright plate extending outwardly and forwardly from said front end surface, a second upright plate extending transversely from a front end of said first upright plate in a direction away from said retaining lug and spaced apart from said front end surface, and a horizontal plate extending outwardly and forwardly from said front end surface and connected to said first and second upright plates, and wherein, when said engaging hole is engaged to said engaging member, said horizontal plate is inserted into said second hole portion and said second upright plate abuts against a wall of said cutout groove that is immediately adjacent to said second hole portion.

19. The scanning module as claimed in claim 18, wherein said module body further includes a positioning block protruding outwardly and forwardly from said front end surface, said positioning block having an engaging end surface facing and spaced apart from said hole of said retaining lug, and a guiding bevel facing and spaced apart from said first upright plate of said engaging member, said carrier further including an engaging hook connected to said rear wall, said guiding bevel guiding said engaging hook to move toward and engage said engaging end surface.

20. The scanning module as claimed in claim 13, wherein said module body includes a front end surface, said carrier protruding outwardly from and being integrally formed as one piece with said front end surface.

\* \* \* \* \*